(No Model.)
C. H. CARTER.
Plow.
No. 242,508.  Patented June 7, 1881.
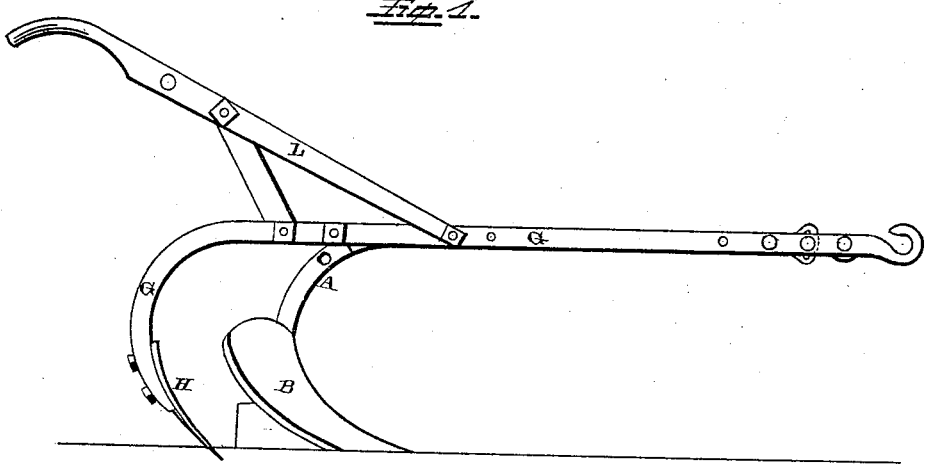
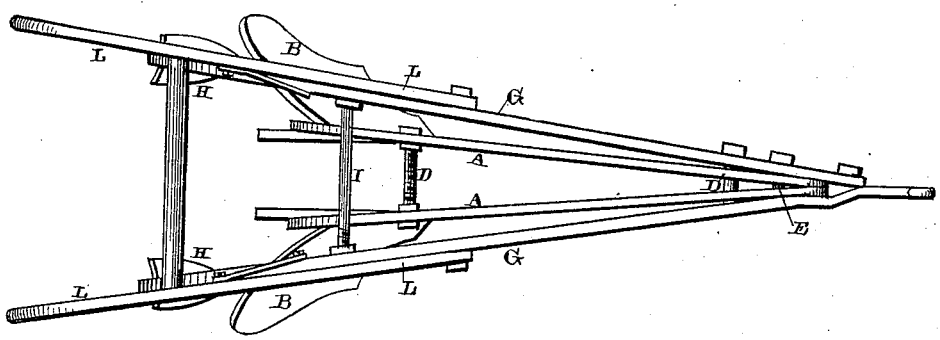
Witnesses.
W. W. Mortimer
W. H. Kern
Inventor
C. H. Carter,
per
F. A. Lehmann,
Atty.

UNITED STATES PATENT OFFICE.

CHARLES H. CARTER, OF STRANGER, TEXAS.

PLOW.

SPECIFICATION forming part of Letters Patent No. 242,508, dated June 7, 1881.

Application filed April 4, 1881. (No model.)

*To all whom it may concern:*

Be it known that I, CHARLES H. CARTER, of Stranger, in the county of Falls and State of Texas, have invented certain new and useful Improvements in Plows; and I do hereby declare the following to be a full, clear, and exact description of the invention, such as will enable others skilled in the art to which it pertains to make and use it, reference being had to the accompanying drawings, which form part of this specification.

My invention relates to an improvement in plows; and it consists in the combination of the two plows, which are attached to separate beams of their own, and which run upon opposite sides of the growing plants for the purpose of cutting away weeds and dirt from around them, with two cultivators or shovels, which run immediately in the rear of the said plows, and which cultivators are attached to beams of their own and serve to throw the dirt back toward the plants, as will be more fully described hereinafter.

The object of my invention is to produce a double plow which will cut all of the weeds loose upon each side of the row of growing plants and throw them aside, and then throw back toward the plants fresh earth, so as to take the place of that which has been cut away by the plows.

Figure 1 is a side elevation of my invention. Fig. 2 is a plan view of the same.

A A represent the two flat curved beams to which the plows B are secured. These plows have their mold-boards turned in opposite directions, and are separated just far enough from each other to run upon opposite sides of the plants and cut away the weeds and dirt.

The distance apart which the plows shall run is regulated by a screw-rod, D, which passes through the two beams near their rear ends. The front ends of these two beams are brought together and are pivoted upon the bolt D', which passes through all four beams, as shown in Fig. 2. Through the extreme front of these two beams is made a slot or a series of holes, by means of which the front ends of the two beams can be raised and lowered upon the bolt E, for the purpose of causing the two plows to run shallow or deep, as may be desired.

Outside of these two beams are two other flat curved beams, G, which have secured to their lower ends the inwardly-curved shovels H, which run immediately behind and deeper than the two plows, and serve to throw dirt inward toward the plants. These two outer beams are rigidly secured together at their front ends by the two bolts already referred to, and their distance apart is regulated by the screw-bolt I. To these outer beams are secured the handles L, which can be adjusted forward and back or applied to the inner beams, as may be found preferable.

The two plows running upon opposite sides of the plants cut up the weeds and throw them to one side, leaving the roots of the plants slightly exposed, and these roots the cultivators entirely cover up by throwing fresh earth upon them. These shovels being placed wider apart than the plows throw soft fresh earth just up to the plants, but never throw dirt upon them in such a way as to injure them in any manner.

By using four beams, as here shown, the plows and the shovels can be adjusted in any desired relation to each other laterally, and the plow is made stronger, more durable, and more easily handled.

I am aware that it is old to place a smaller plow or cultivator behind the front one, and that it is not new to scrape and plow at the same time, and this I disclaim.

Having thus described my invention, I claim—

In a plow, the combination of the two beams A, provided with the two plows B, which have their mold-boards turned in opposite directions, the two outside beams, G, having the shovels secured to them, and which are made to run deeper and in the rear of the plows and to throw the dirt inward toward the plants, the two beams A being adjustable between the two outer beams, substantially as shown and described.

In testimony whereof I affix my signature in presence of two witnesses.

CHARLES HENRY CARTER.

Witnesses:
WM. ASH. ROBINSON,
I. N. STANFORD.